(12) United States Patent
Sinha

(10) Patent No.: US 10,212,743 B2
(45) Date of Patent: Feb. 19, 2019

(54) SYSTEM AND METHOD FOR ESTABLISHING COMMUNICATION BETWEEN PLURALITY OF INTERNET OF THINGS DEVICES

(71) Applicant: Alok V Sinha, New Delhi (IN)

(72) Inventor: Alok V Sinha, New Delhi (IN)

( * ) Notice: Subject to any disclaimer, the term of this patent is extended or adjusted under 35 U.S.C. 154(b) by 0 days.

(21) Appl. No.: 15/186,431

(22) Filed: Jun. 18, 2016

(65) Prior Publication Data

US 2017/0367132 A1    Dec. 21, 2017

Related U.S. Application Data

(60) Provisional application No. 62/181,761, filed on Jun. 18, 2015.

(51) Int. Cl.
| | |
|---|---|
| *H04W 4/70* | (2018.01) |
| *H04W 4/80* | (2018.01) |
| *H04W 8/00* | (2009.01) |
| *H04W 76/14* | (2018.01) |
| *H04L 12/28* | (2006.01) |
| *H04W 76/11* | (2018.01) |
| *H04W 12/08* | (2009.01) |
| *H04L 29/06* | (2006.01) |

(52) U.S. Cl.
CPC ......... *H04W 76/14* (2018.02); *H04L 12/2816* (2013.01); *H04W 4/70* (2018.02); *H04W 8/005* (2013.01); *H04W 12/08* (2013.01); *H04W 76/11* (2018.02); *H04L 63/104* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 2014/0143337 A1* | 5/2014 | McIntosh | H04L 67/02 709/204 |
| 2014/0242983 A1* | 8/2014 | Chang | H04W 76/023 455/434 |
| 2015/0019710 A1* | 1/2015 | Shaashua | G06F 17/30705 709/224 |
| 2015/0019714 A1* | 1/2015 | Shaashua | H04L 67/24 709/224 |
| 2015/0334554 A1* | 11/2015 | Song | H04W 8/205 455/558 |
| 2016/0050553 A1* | 2/2016 | Kang | G06Q 30/0601 455/41.2 |
| 2016/0149917 A1* | 5/2016 | Matthieu | H04L 63/10 726/4 |
| 2016/0278147 A1* | 9/2016 | Adrangi | H04W 4/005 |

(Continued)

*Primary Examiner* — David Bilodeau

(57) ABSTRACT

A system and method for establishing communication between plurality of Internet of Things devices is provided. The method includes receiving a request from a first device to communicate with a second device via a server. Further, the first device and the corresponding module among a list of modules is identified by the server based on the received request, and thereafter the request is relayed to the identified corresponding module. Further, the second device and its corresponding module is identified by the server based on the received request. Communication is established between the corresponding module of the first device and the corresponding module of the second device.

7 Claims, 14 Drawing Sheets

(56) References Cited

U.S. PATENT DOCUMENTS

2017/0063968 A1* 3/2017 Kitchen ................. H04L 67/10
2017/0227965 A1* 8/2017 Decenzo .............. G05D 1/0094
2017/0311115 A1* 10/2017 Adrangi ................ H04W 4/005

* cited by examiner

G8 LIFEON MEDIA ARCHITECTURE - AUTOMOTIVE

G8 LIFEON ARCHITECTURE - WELLNESS

SYSTEM AND METHOD FOR ESTABLISHING COMMUNICATION BETWEEN PLURALITY OF INTERNET OF THINGS DEVICES

CROSS-REFERENCE TO RELATED APPLICATIONS

This application is a non-provisional application claiming the benefits of provisional application No. 62/181,761 filed Jun. 18, 2015.

BACKGROUND OF THE INVENTION

Field of Invention

The present invention relates generally to the technical areas of the Internet of Things, more particularly but not exclusively to communication between Internet of Things devices.

Description of Related Art

In recent years a slew of devices, called Internet of Things (IOT) have emerged. These devices are internet enabled devices and speaks their own language and use their own technology. Thus, making it difficult to establish a communication between them and thereby not letting us optimally benefit from these devices.

The terminology of Internet of Things (IOT) refers to the network of devices or things that contain embedded technology with electronics, software, sensors and connectivity to communicate and sense or interact with their internal states or the external environment. Each device or thing is uniquely identifiable through its embedded computing system but is able to incorporate within the existing internet infrastructure. Every device based on IOT technology has a different communication way for example different frequency, different protocol, different standards . . . etc. It takes multiple levels of expertise for any entity to make one device talk to another. There is lack of common pluggable platform on which all IOT devices can connect with each other.

Users need to install numbers of apps to learn, use and setup the devices and currently there are no ways to run these devices as one system. For many of these devices and currently there are no ways to run these devices as one system. For many of these devices, use also needs to have separate wireless adapter plugged into the wall.

In view of the above drawbacks there is a need for an improved technique to enable communication between these devices.

BRIEF SUMMARY OF THE INVENTION

Accordingly, an improved technique to overcome the above problems is needed. To fulfill this need, a system and method for establishing communication between plurality of Internet of Things devices is provided. In an embodiment, the method includes receiving a request from a first device to communicate with a second device via a server. Further, the first device and the corresponding module among a list of modules is identified by the server based on the received request, and thereafter the request is relayed to the identified corresponding module. Further, the second device and its corresponding module is identified by the server based on the received request. Communication is established between the corresponding module of the first device and the corresponding module of the second device.

In another embodiment, a system for establishing communication between plurality of Internet of Things devices is provided. The system comprises a server comprising a LifeOn platform module configured to receive a request from a first device to communicate with a second device via a server. Further, the first device and the corresponding module among a list of modules is identified by the server based on the received request, and thereafter the request is relayed to the identified corresponding module. Further, the second device and its corresponding module is identified by the server based on the received request. Communication is established between the corresponding module of the first device and the corresponding module of the second device.

In yet another embodiment, a non-transitory computer readable medium for establishing communication between plurality of Internet of Things devices is provided. The set of instructions when executed by a processor causes the processor to performs steps comprising receive a request from a first device to communicate with a second device via a server. Further, the first device and the corresponding module among a list of modules is identified by the server based on the received request, and thereafter the request is relayed to the identified corresponding module. Further, the second device and its corresponding module is identified by the server based on the received request. Communication is established between the corresponding module of the first device and the corresponding module of the second device.

Other objects, features, and advantages of the present invention may become apparent from the following detailed description. It should be understood that however, the detailed description and specific examples, while indicating preferred embodiments of the present invention, are given by way of illustration only and various modifications may naturally be performed without deviating from the present invention.

DESCRIPTION OF DRAWINGS

Embodiments are illustrated by way of example and not limitation in the figures of the accompanying drawings, in which like references indicate similar elements and in which.

DETAILED DESCRIPTION OF THE INVENTION

The following detailed description includes references to the accompanying drawings, which form part of the detailed description. The drawings show illustrations in accordance with example embodiments. These example embodiments are described in enough details to enable those skilled in the art to practice the present subject matter. However, it may be apparent to one of ordinary skill in the art that the present invention may be practised without these specific details. In other instances, well-known methods, procedures and components have not been described in detail so as not to unnecessarily obscure aspects of the embodiments. The embodiments can be combined, other embodiments can be utilized or structural and logical changes can be made without departing from the scope of the invention. The following detailed description is, therefore, not to be taken as a limiting sense.

In this document, the terms "a" or "an" are used, as is common in patent documents, to include one or more than one. In this document, the term "or" is used to refer to a non-exclusive "or," such that "A or B" includes "A but not B," "B but not A," and "A and B," unless otherwise indicated.

It should be understood that the capabilities of the invention described in the present disclosure and elements shown in the figures may be implemented in various forms of hardware, firmware, software, recordable medium or combinations thereof.

The embodiments disclose technique for establishing communication between plurality of Internet of Things devices. For example, an embodiment provides a method for enabling such communication, in which, a request from a first device to communicate with a second device is received by a server. Further, the server identifies the first device and the corresponding module among a list of modules based on the received request, and the request is relayed to the identified corresponding module.

Further, the server may identify the second device and its corresponding module based on the received request and establishes communication between the corresponding module of the first device and the corresponding module of the second device. The mode of communication between the corresponding module of the first device is same as the corresponding module of the second device, however, the mode of communication between the server and the first device is different from the mode of communication between the server and the second device.

Figure 1:
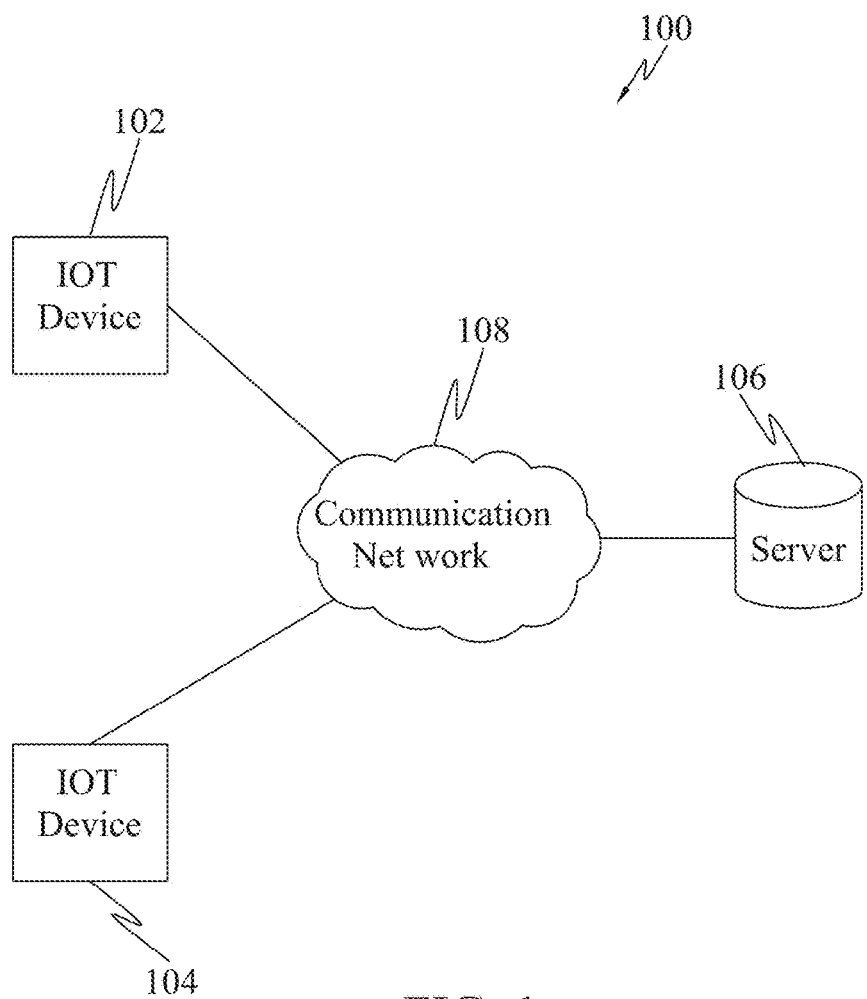
FIG. 1 is an exemplary architecture of a system 100 for establishing communication between Internet of things devices, in accordance with an embodiment.

FIG. 1 is an exemplary architecture of a system 100 for establishing communication between Internet of things devices, in accordance with an embodiment. The system 100 may include a first device 102, a second device 104, a server 106 and communication network 108.

The first device 102, second device 104 and the server 106 may communicate with each other through the communication network 108. For the sake of easy understanding only two IOT devices 102 and 104 are shown in FIG. 1, however, one of ordinary skilled in the art may comprehend that there can be plurality of such IOT devices.

The first device 102 and the second device 104 may include any IOT device for example, but not limited to, a mobile phone, refrigerator, thermostat, vehicle, lighting device, music system, fitness tracker, television, air conditioner, and smart lock among others IOT devices know in the art. In an embodiment, the first device 102 and the second device 104 may be working on different modes of communication hence a direct communication between the first device 102 and the second device 104 may not be established.

Figure 2:
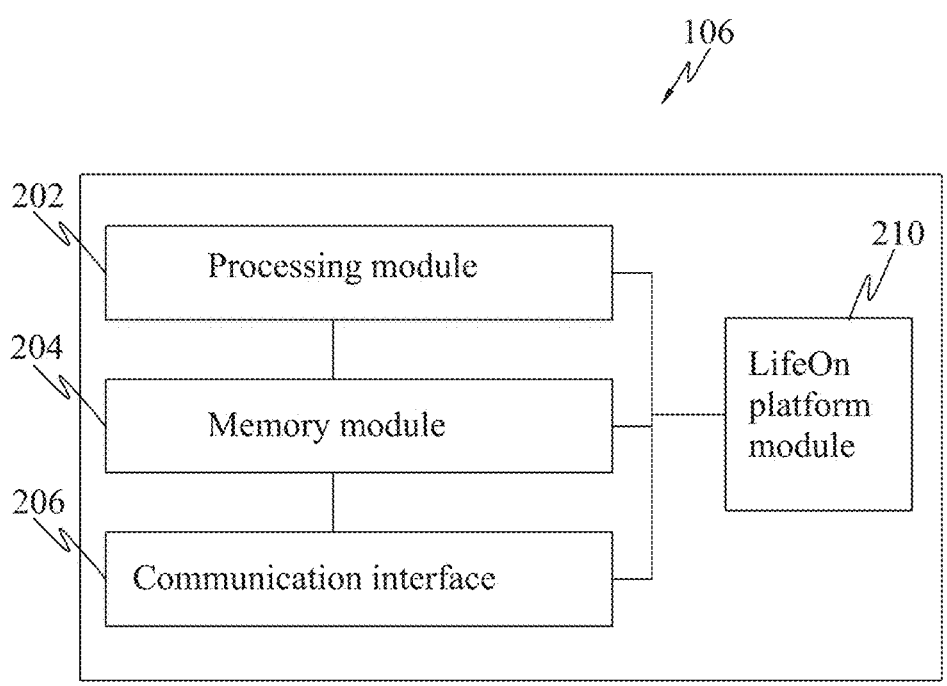
FIG. 2 is an exemplary block diagram of the server 106 of the system 100, in accordance with an embodiment.

FIG. 2 is an exemplary block diagram of the server 106 of the system 100, in accordance with an embodiment. The server 106 may include a processing module 202, a memory module 204, a communication interface 206, a bus 208 interconnecting all the modules of the server 106, and a LifeOn platform module 210.

The processing module 202 is implemented in the form of one or more processors and may be implemented as appropriate in hardware, computer-executable instructions, firmware, or combinations thereof. Computer-executable instruction or firmware implementations of the processing module 202 may include computer-executable or machine-executable instructions written in any suitable programming language to perform the various functions described.

The memory module 204 may include a permanent memory such as hard disk drive, may be configured to store data, and executable program instructions that are implemented by the processing module 202.

The memory module 204 may be implemented in the form of a primary and a secondary memory. The memory module 204 may store additional data and program instructions that are loadable and executable on the processing module 202, as well as data generated during the execution of these programs. Further, the memory module 204 may be a volatile memory, such as a random access memory and/or a disk drive, or a non-volatile memory. The memory module 204 may comprise of removable memory such as a Compact Flash card, Memory Stick, Smart Media, Multimedia Card, Secure Digital memory, or any other memory storage that exists currently or may exist in the future.

The communication interface 206 may provide an interface between the communication network 108 and the server 106. The communication interface 206 may include a modem, a network interface card (such as Ethernet card), a communication port, and a Personal Computer Memory Card International Association (PCMCIA) slot, among others. The communication interface 206 may include devices supporting both wired and wireless protocols. Data in the form of electronic, electromagnetic, optical, among other signals may be transferred via the communication interface 206.

The LifeOn platform module 210 may send information to or receive information from one or more IOT devices 102 and 104 thereby establishing communication between a plurality of IOT devices. In the instant embodiment, the IOT devices may be of same vendor or different vendor, flowing same or different protocols, using different or same frequencies, and using same or different technologies, among others.

The LifeOn platform module 210 may be configured to integrate all devices classified as digital technology with each other. The LifeOn platform module 210 maybe a Multi-modal, which integrates Wifi® GSM/GPRS, NFC, OBD, Z-Wave®, Insteon, WebAPI, Health devices, external content, services—under one API framework. The LifeOn platform module 210 may be configured to provide a platform that transcends technology, computer software and human services to integrate as a single deployable platform. The LifeOn platform module 210 may comprise the plugins that communicate to IOT devices over Wifi®, RS232, Bluetooth®, GSM, Utility plugins, API plugins. Additionally, the LifeOn platform module 210 may expose the restful API for devices to all and integrate with other IOT devices and the present invention.

The communication network 114 may include a wired network, a wireless network, or a combination of wired network and wireless network. For example, the communication network 108 may include home network, local area network, wide area network, and metropolitan area network, among others.

Figure 3:
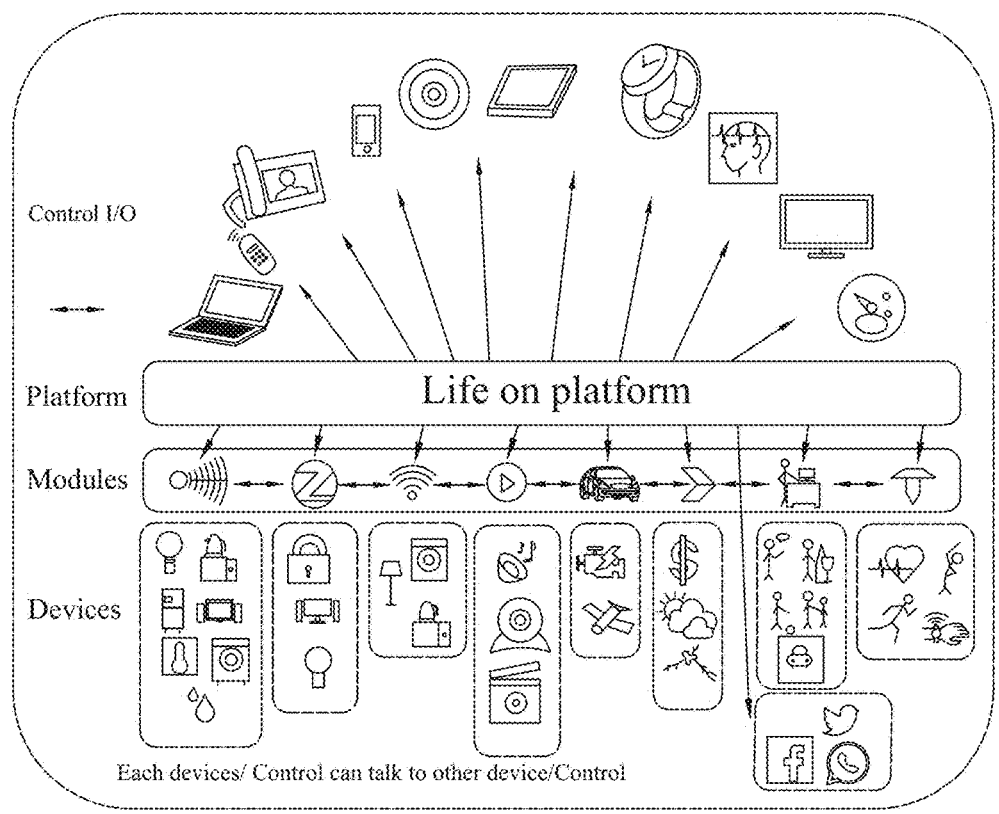
FIG. 3 illustrates an exemplary broad overview of the present invention, in accordance with an embodiment.

FIG. 3 illustrates an exemplary broad overview of the present invention, in accordance with an embodiment. FIG. 3 shows exemplary control input/output devices which can be used to control one or more IOT devices via the LifeOn platform module 210. The server 106 may include a list of modules (as shown in the FIG. 3). The list of modules may include technologies like Near Field Communication (NFC), Bluetooth®, Wifi®, LAN, and mesh among other modules used for IOT devices by one or more vendors.

The IOT device 102 may send a request to the server 106 to communicate with the IOT device 104. The LifeOn platform module 210 of the server 106 may identify the IOT device 102 and the corresponding module from the list of modules in the server 106. Further, the LifeOn platform module 210 communicates the request to the identified module from the list of modules. Simultaneously, the LifOn platform module 210 may be configured to identify the IOT device 104 and its corresponding module among the list of modules based on the request received from the IOT device 102.

The modules associated with the LifeOn platform module 210 may be configured to convert the data/instructions received from the IOT devices 102 and 104 into a new data format such that the IOT devices 102 and 104 operating on different communication modes and technologies may communicate with each other.

Referring to FIG. 3, which illustrates an exemplary logical overview of the system 100, in accordance with an embodiment. The selected module may receive requests/instructions from devices/sensors and further communicate with the LifeOn platform module 210. The LifeOn platform module 210 may then communicate with various IOT enabled control input/output devices.

Figure 4:
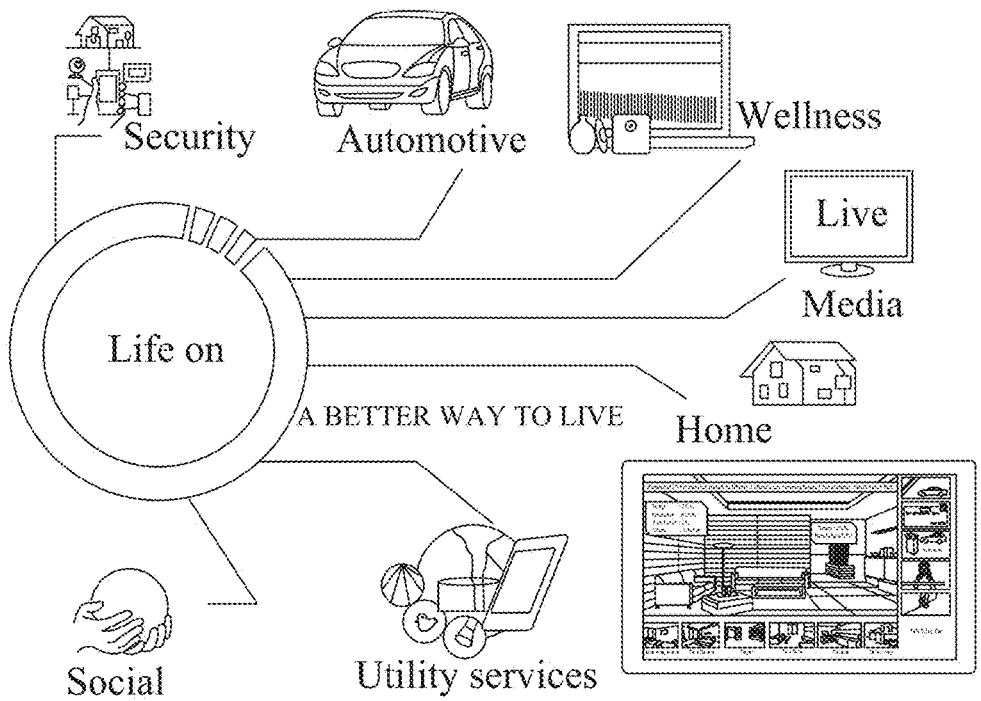
FIGS. 4, 5 and 6 illustrates an implementation of system 100 to for integrating devices pertaining to multiple domains, in accordance with an embodiment.
Figure 5:
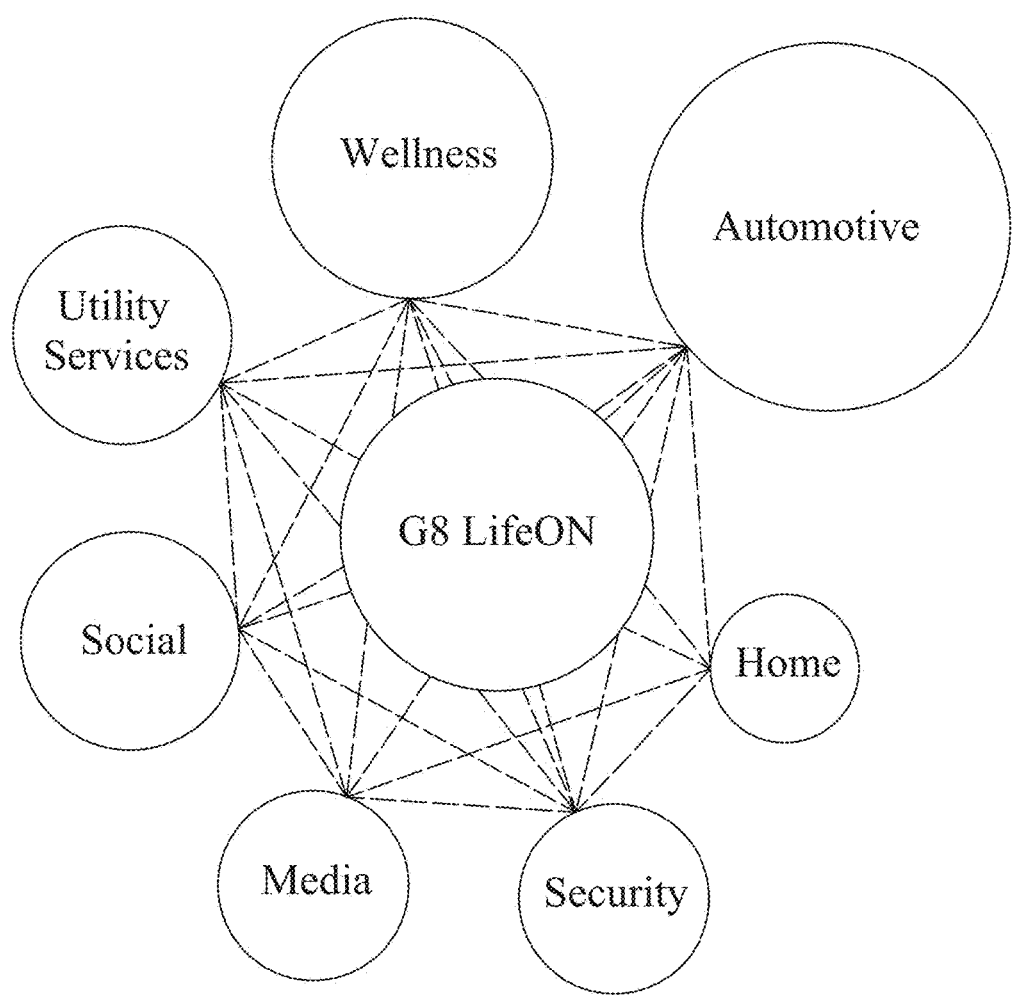
Figure 6:
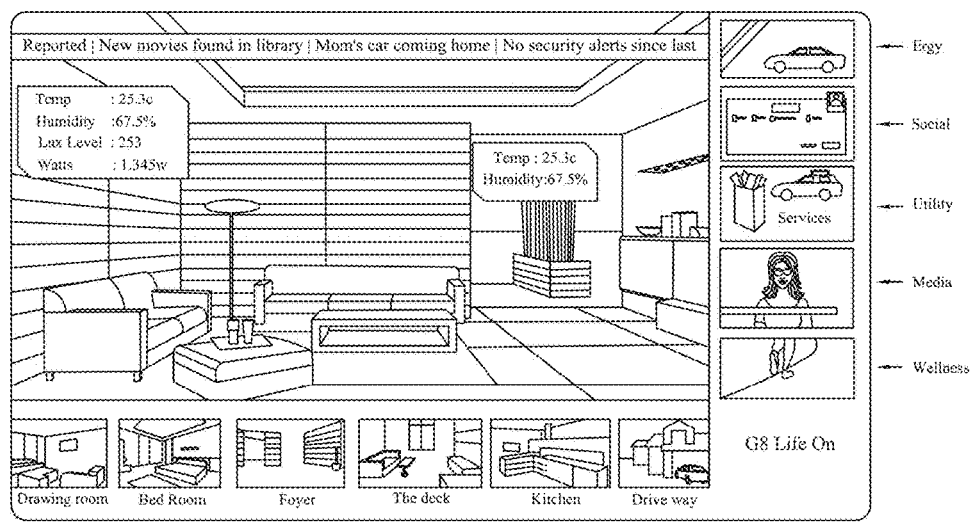

In an embodiment, as illustrated in FIGS. 4, 5 and 6, the LifeON platform module 210 may enable integration of IOT devices corresponding to different domains for example home, automotive, wellness, social, media, security, and utility services among others IOT devices. These devices may correspond to same or different vendors operating on similar or different technologies. Further, a user may monitor or control the one or more IOT devices using control input/output devices as shown in FIG. 3.

In an embodiment, the control input/output devices may accept inputs from devices such as, but not limited to, Android™ devices, IOS® devices, and any other native mobile application based devices, among others. Further, the control inputs accepted from such devices include device status inputs, social media based inputs, browser based inputs, Near Field Communication based inputs, sensor based inputs, inputs from remote controls, voice based inputs, weather service based inputs, time of the day, and status changes of the device, body sensor inputs, inputs from automotive sensors, inputs from home automation sensors, surveillance devices, and inputs from energy meter, among others.

Further, the LifeOn platform module 210 may be configured to alert, modify, or alter operation of one or more IOT devices based on the inputs received from one or more different IOT devices. The LifeON platform 210 may have one or more predetermined logics based on which the one or more decisions corresponding to the operation of one or more IOT devices are made.

The communication between the devices may happen through the LifeOn platform module 210. Where the IOT devices may communicate with the LifeOn platform module 210 through via the server 106 and/or a portable device (also referred to as G8 LifeON in drawings). Each of the modules among the list of modules associated with the LifeOn platform module 210 may be configured to convert the instructions received from one or more IOT devices into a simple Universal Resource Locator (URL) based instructions.

One exemplary simple URL based instruction (also referred to as Application Program Interface (API)) is shown below, in accordance with an embodiment.

$$\underbrace{https://g8usa.g8.net:80/lo/api\_php?}_{a}\underbrace{g8\_cmd=GET}_{b}\underbrace{\&g8\_lo\_id=1077}_{c}\underbrace{\&g8\_param=SetStatus}_{d}\underbrace{\&g8\_value=on}_{e}$$

The simple URL based instruction may include 5 different segments 'a' to 'e' as shown above, where segment 'a' may include any server name and port combination depending on where the server 106 with LifeON platform module 210 is installed. Further the second segment 'b' may define the command to be executed for example, g8_cmd=GET/SET/ALT/CORE (where GET may read data, SET may write data, ALT may set an alert, and CORE may be related to system configuration commands)

Further, the segment 'c' may represent a unique IOT device. Segment 'd' may define a parameter corresponding to the unique IOT device. Finally, the segment 'e' may define a value to set for the defined parameter. For example, the different values may include On, off, 0, and 1, among other different values. It can be understood that each IOT device may has a plurality of parameters and each such parameter can be associated with one or more values.

Figure 7:
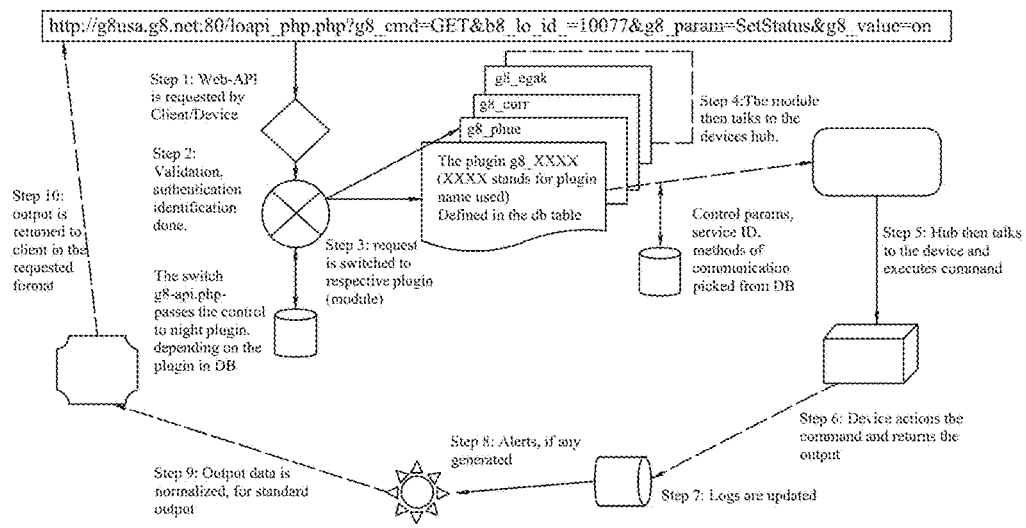
FIG. 7 illustrates an exemplary flow of instructions to establish communication using system 100 in accordance with an embodiment.

FIG. 7 illustrates an exemplary flow of instructions to establish communication using system 100 in accordance with an embodiment. In this implementation there can be two modules, the first module is impended by the server 106 and the second module is implemented by a portable device (also referred to as G8 LifeON in drawings). The framework of the portable device may be modular with an abstract layer that integrates variety of devices. Further, the User Interface (UI) may be based on for example Hyper Text Markup Language (HTML 5), which is available for across multiple platforms such as Mobile, Tablets, Laptops, and Desktops, among others. The framework may include technologies for example but not limiting to Fitbit®, Z-Wave®, Schalge®, and Xbmc, among others.

Referring to FIG. 7 in step 1 web-API is requested by client/IOT device. Further, in step 2, validation, authentication and identification of the IOT device is performed. Thereafter, a switch g8_api.php may initiate passing the control to the corresponding module among a list of modules in a database associated with the LifeOn platform module 210. Further, at step 3 the request is switched to the respective module (also referred to as plugin). At step 4, the respective module may initiate communication with the hub/IOT device. Further at step 5 may initiate executing commands, thereupon at step 6 the IOT device may act based on the received commands and return the output. Further, at step 7, information corresponding to the actions and outcome along with timing and other necessary information may be stored/updated to the logs. At step 8, the server determines if the results or the outcome correspond to an alert raising condition and may generate an alert. At step 9, output data is normalized for standard output. Finally, at step 10 output is returned to client in the requested format.

Figure 8:
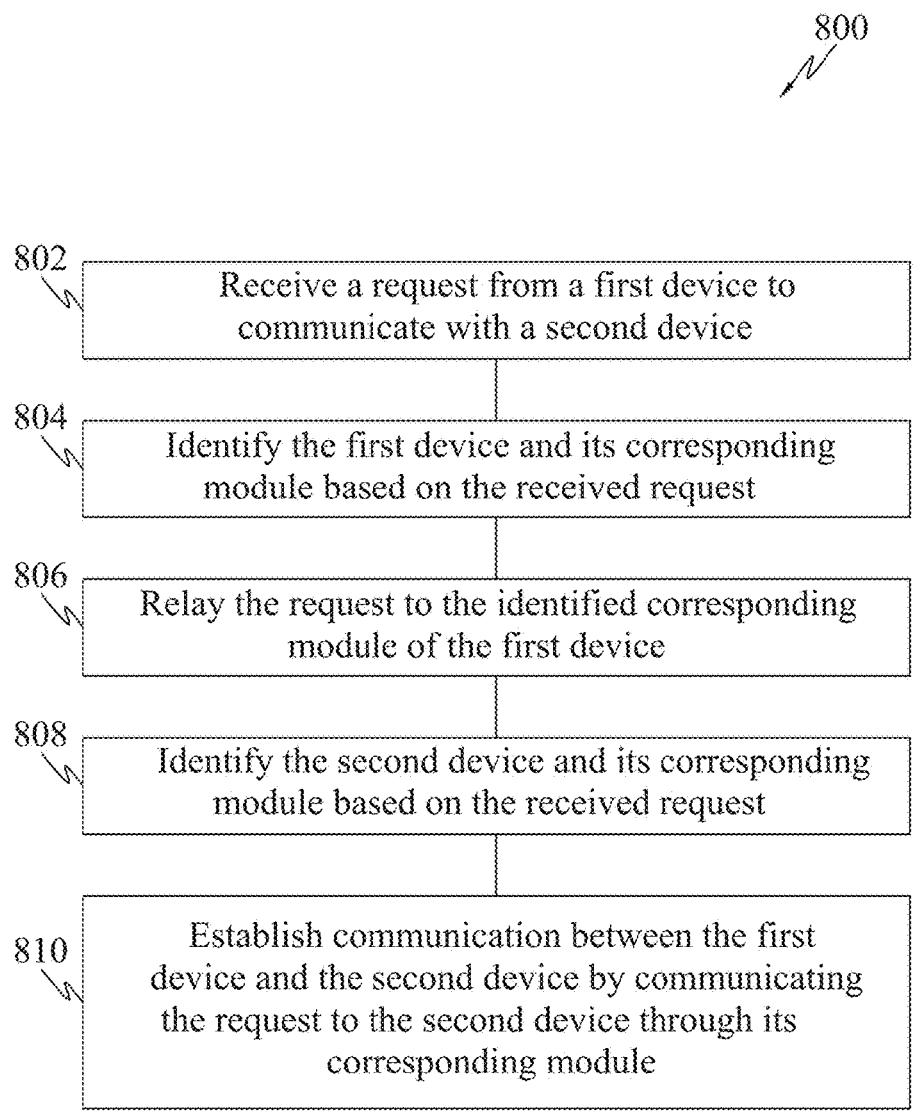
FIG. 8 is a flowchart of an exemplary method 800 for establishing communication between plurality of IOT devices, in accordance with an embodiment.

FIG. 8 is a flowchart illustrating a method 800 for establishing communication between plurality of IOT devices, in accordance with an embodiment. At step 802 a request may be received from a first device (102) by the server 106 to communicate with a second device (104). Further, at step 804 the server 106 may identify the first device 102 and its corresponding module among a list of modules stored therein for converting the communication into a LifeOn platform module mode of communication. Further, at step 806, the server 106 may request may be relayed to the identified module associated with the first device.

Further, at step 808, the server 106 may identify the second device and its corresponding module based on the received request. Further at step 810, the server may establish communication between the first device and the second device by communicating the request to the second device through it corresponding module via the LifeOn platform module 210 of the server 106.

The following are few of the exemplary implementations/use cases of the present technology:

The first use case is when we use the present technology to wake up a user as following:

LifeOn platform module may understand the wakeup alarm set on the user's mobile device. Further, the LifeOn platform module may turn on the water geyser 120 mins before the alarm time. Further, it may turn on the coffee machine 15 mins before the alarm time. Furthermore, may turn on music 2 mins before the alarm time.

At the time of alarm, the TV may be switched ON taking the user to morning channel, further, in case of sunrise opens the shade and if lighting is not enough switches the lights ON.

A minute after the alarm time the LifeOn platform module may disarm the various alarms, speak out days weather, latest five news items, remind you if today is your gym day, among other activities.

The second use case is when the user uses the present technology to pace his/her wellness as following:

Considering the user's previous day was an intense work day and he/she missed gym. As the user gets ready for gym the LifeOn platform module may display the following on one of the users TOT devices: calorie burnt pattern, weight tracked over the last 2 months and a summary.

When the user reaches the gym the LifeOn platform module may monitor the calories burnt and user weight through respective IOT devices. Further, even while the user is sleeping the users sleep pattern may be monitored to ensure the user wakes up fresh. Further, room humidity, lighting, and temperature according to the user's requirements. Additionally, alerts may me generated in case of a medical condition to notify nearby hospitals.

The third use case is when the user uses the present technology while going home. At the end of a hard day, when the user is driving back home and when he/she is within 5 miles the LifeOn platform module may communicate with the user about the current temperature and receive one or more inputs pertaining to AC, coffee machine, lighting, and geyser, among others. For example the following message may be sent to the user "Hey Alok, I see that you are coming home. In anticipation, I have switched on the air conditioner and the coffee will be ready by the time you reach home. If you are not coming in, just say 'Not Coming'".

The fourth exemplary use case of the present technology is to use a user's phone to enter his/her home in the following manner. The user can simply tap his phone at the door to lock/unlock the door. Further, the LifeOn platform module recognizes the users phone at the door and may open the door for the user. The lighting, air conditioning, alarms and other appliances can be incorporated to operate together based on the user's requirements. Central control by building security is also possible. Remote alerts on door open/lock may be provided.

The fifth exemplary use case of the present technology in listening to music is in the following manner. As a user sits down to relax and unwind, he/she doesn't have to fiddle with the phone for music. The LifeOn platform module may automatically determine that the user wants to listen to music and may launch TV, STB, Home theatre Remote on phone. It may stream your phone music to home theatre speaker system. Additionally, in case of an incoming call the music can be muted. The LifeOn platform module may stream music, video, pictures from user's phone. The present technology may also be used to manage energy in homes and thereby reducing energy bills. The LifeOn platform module may even protect homes by checking for spikes in load consumed, identify leakage points, wiring deficiency, among others.

Figure 9:
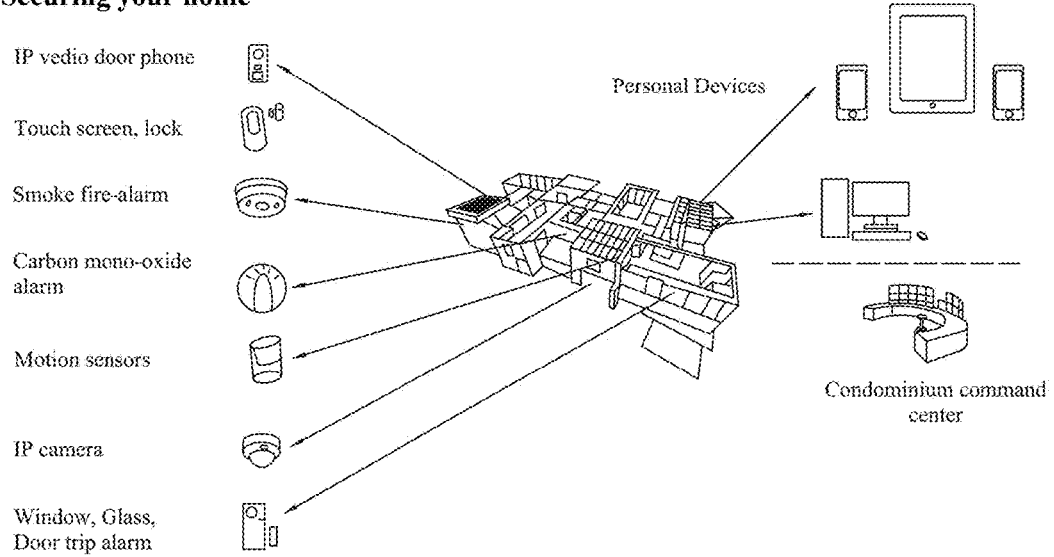
FIG. 9 illustrates an exemplary implementation of system 100 to interconnect the security systems for homes, in accordance with an embodiment.

FIG. 9 illustrates an exemplary implementation of system 100 to interconnect the security systems for homes, in accordance with an embodiment. The figure illustrates the plurality of devices that can be integrated via the LifeOn platform module for securing a home. Further controlling/monitoring using one or more personal device.

Figure 10:
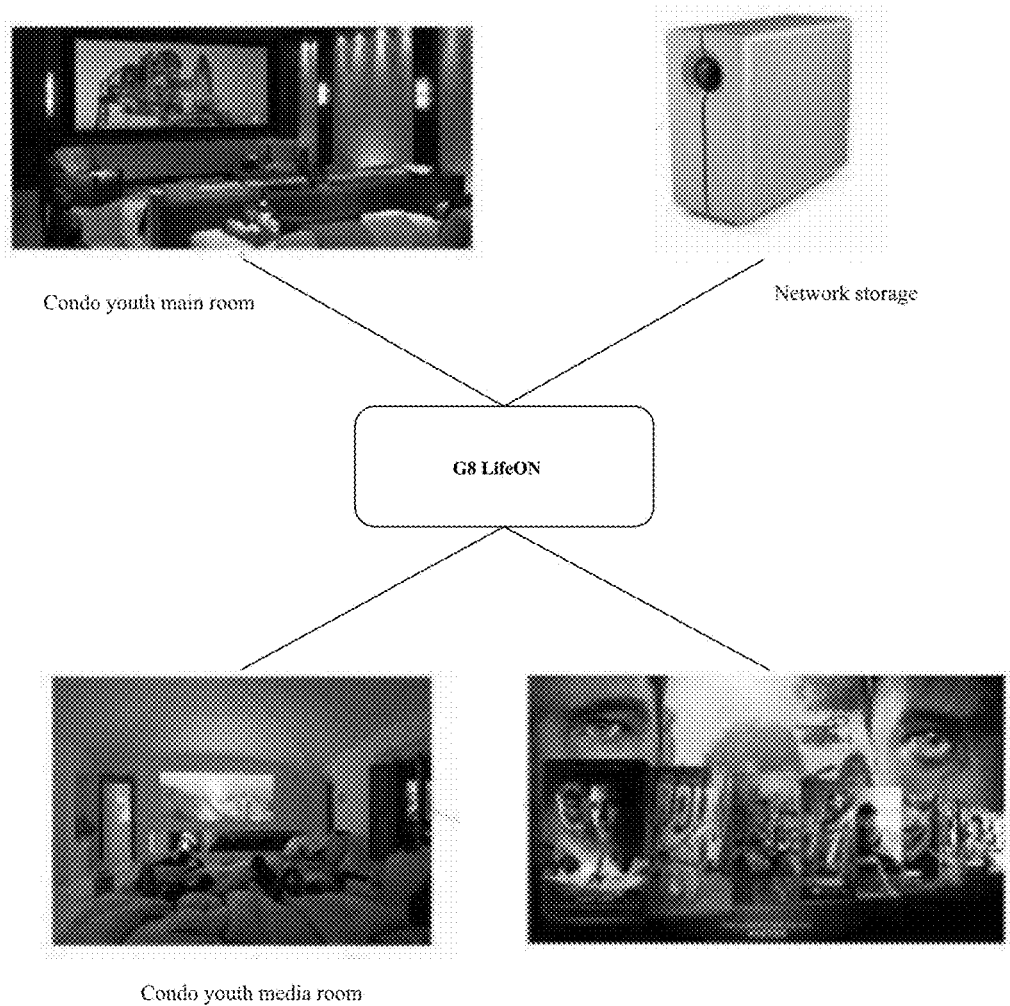
FIG. 10 illustrates an exemplary implementation of system 100 to manage and interconnect the framework and media, in accordance with an embodiment.

FIG. 10 illustrates an exemplary implementation of system 100 to manage and interconnect the framework and media, in accordance with an embodiment.

Figure 11:
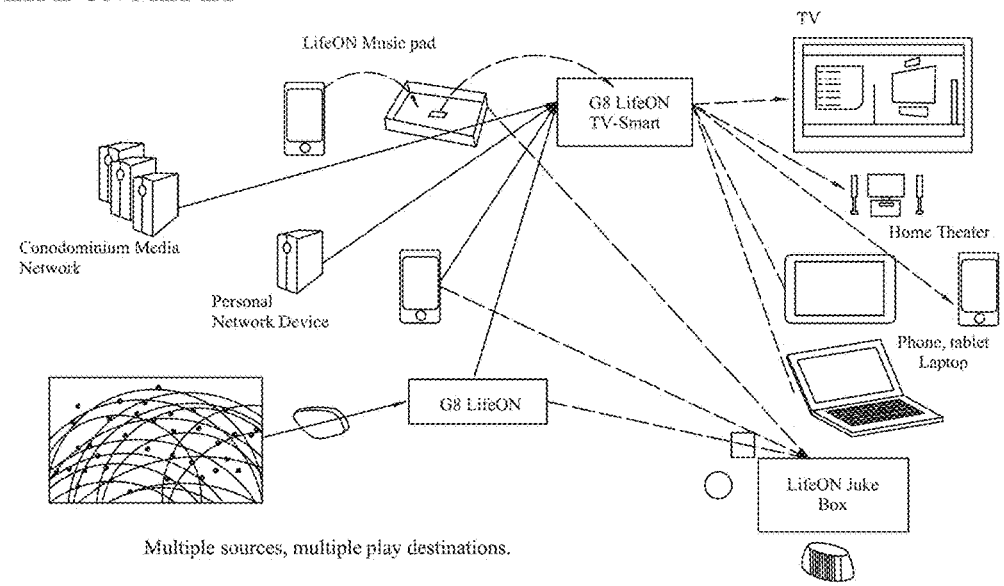
FIG. 11 illustrates an exemplary implementation of system 100 to manage media, in accordance with an embodiment.

FIG. 11 illustrates an exemplary implementation of system 100 to manage media, in accordance with an embodiment.

Figure 12:
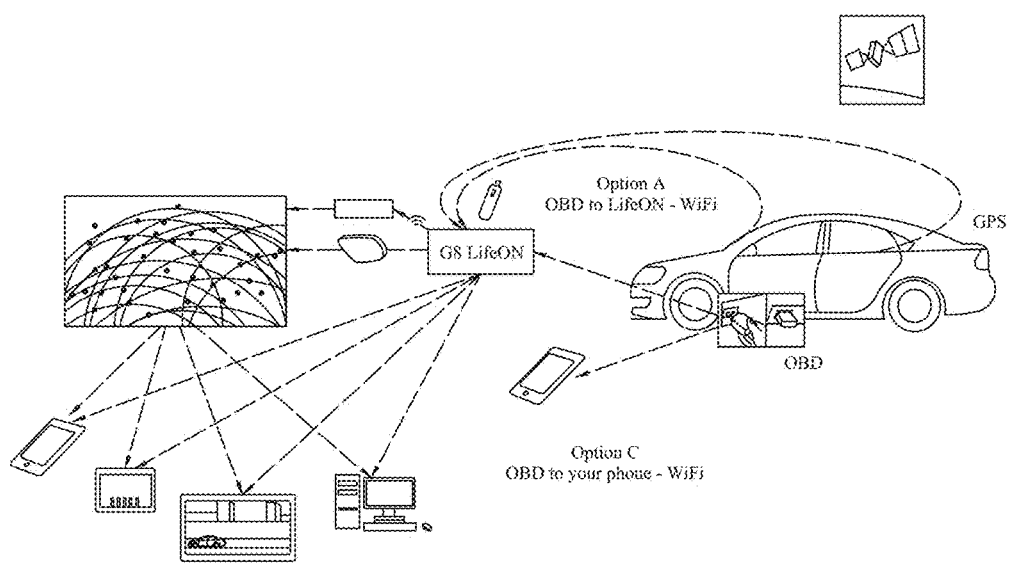
FIG. 12 illustrates an exemplary implementation of system 100 to manage cars remotely using the system 100, in accordance with an embodiment.

FIG. 12 illustrates an exemplary implementation of system 100 to manage cars remotely using the system 100, in accordance with an embodiment.

Figure 13:
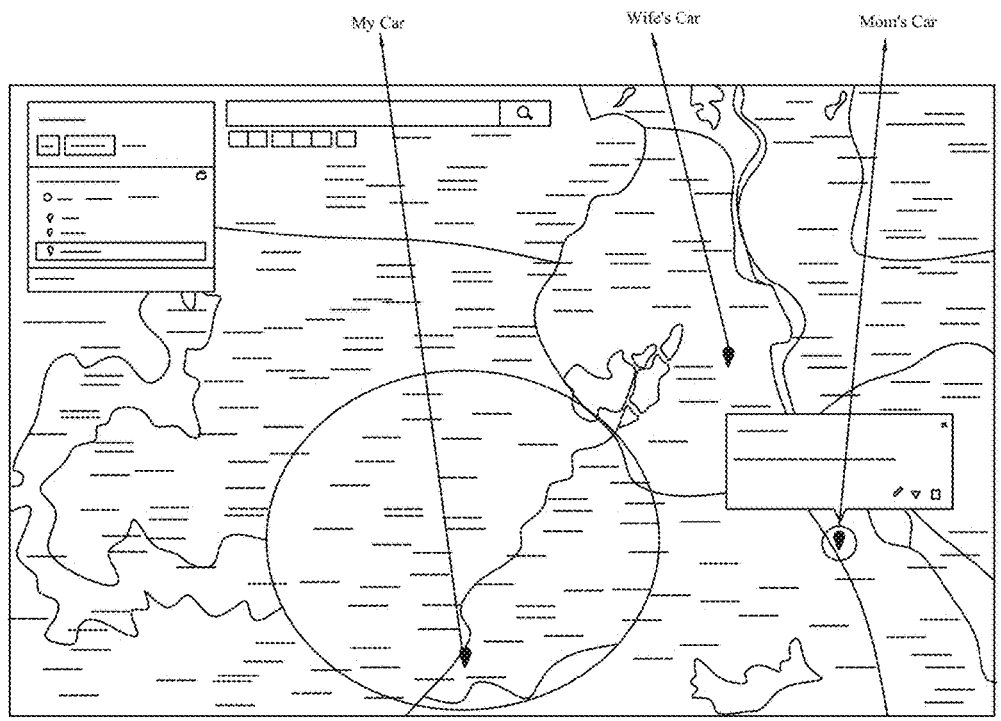
FIG. 13 illustrates an exemplary implementation of system 100 where one or more vehicles may be tracked in accordance with an embodiment.

FIG. 13 illustrates an exemplary implementation of system 100 where one or more vehicles may be tracked in accordance with an embodiment.

Figure 14:
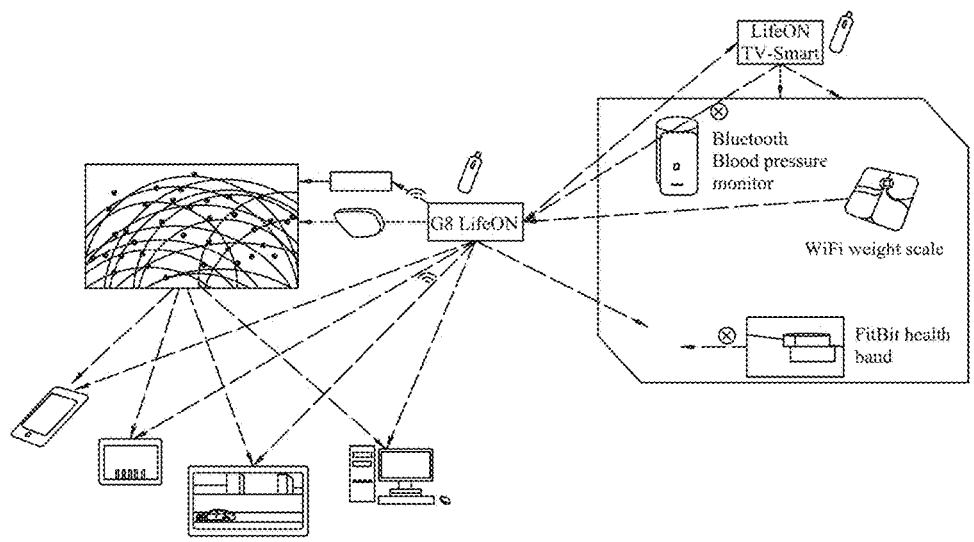
FIG. 14 illustrates an exemplary implementation of system 100 to improve wellness, in accordance with an embodiment.

FIG. 14 illustrates an exemplary implementation of system 100 to improve wellness, in accordance with an embodiment.

The present invention overcomes the drawbacks of the conventional security systems, by providing an improved security system. The present invention as discussed in this document with respect to different embodiments may be advantageous at least in providing the resident or the occupant, a safe and secure feeling, within the closed enclave. This is enabled by securing the premises with an entrance management system that receives information of the visitor from the resident and provides a unique password to the visitor, every single time he visits the closed enclave. This is advantageous in eliminating the possibility of the visitor entering the closed enclave, without the resident's permission. Further, it is advantageous in having a track of the visitor within the closed enclave which reduces the risk of visitors involving in illegal activities. Additionally, it is advantageous in providing a secure environment, by intimating the resident about the behavioural analysis of the visitors. Additional advantages not listed may be understood by a person skilled in the art in light of the embodiments disclosed above.

It shall be noted that the processes described above are described as sequence of steps; this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it may be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention may no doubt become apparent to a person of ordinary skill in the art after having read the foregoing description. It is to be understood that the phraseology or terminology employed herein is for the purpose of description and not of limitation. It is to be understood that the description above contains many specifications; these should not be construed as limiting the scope of the invention but as merely providing illustrations of some of the personally preferred embodiments of this invention. Thus the scope of the invention should be determined by the appended claims and their legal equivalents rather than by the examples given.

What is claimed is:

1. A method for establishing communication between plurality of Internet of Things devices, the method comprising:
   receiving, at a server, a request from a first device to communicate with a second device;
   identifying, by the server, the first device and a first module corresponding to the first device, among a list of modules stored in the server, based on at least the received request and the list of modules, wherein the first module is stored in the server;
   converting, by the first module, the request into a Universal Resource Locator (URL) based instruction, wherein the URL comprises a plurality of segments in the following order: server name, port number, command to be executed, device identity, parameter corresponding to the device, and a value corresponding to the parameter;
   identifying, by the server, the second device and a second module corresponding to the second device, among the list of modules stored in the server, based on at least the received request and the list of modules, wherein the one or more instructions are accessed by the second module, wherein the second module converts the one or more instructions into one or more requests that are capable of being processed by the second device, wherein the second module is stored in the server; and
   establishing communication between the first device and the second device, by the server communicating the one or more requests that are capable of being processed by the second device, to the second device, wherein each of the first module and the second module is a software plugin.

2. The method according to claim 1, wherein a mode of communication between the server and the first device is different from a mode of communication between the server and the second device.

3. The method according to claim 1, further comprising providing a single user interface, using the server, to allow a user to monitor, control or alter the working of the first device and/or the second device.

4. The method according to claim 1, wherein the first device and the second device belongs to different vendors and/or operate on different communication technologies.

5. A system for establishing communication between plurality of Internet of Things devices, the system comprising:
   a server including a platform configured to:
     receive a request from a first device to communicate with a second device;
     identify the first device and a first module corresponding to the first device, among a list of modules stored in the server, based on at least the received request and the list of modules, wherein the first module is stored in the server;
     use a processor of the server, wherein the processor uses the first module to convert the request into a Universal Resource Locator (URL) based instruction, wherein the URL comprises a plurality of segments in the following order: server name, port number, command to be executed, device identity, parameter corresponding to the device, and a value corresponding to the parameter;
     identify the second device and a second module corresponding to the second device, among the list of modules based on at least the received request and the list of modules stored in the server, wherein the second module is stored in the server, wherein the second modules accesses the one or more instructions, wherein the second module converts the one or more instructions into one or more requests that are capable of being processed by the second device; and
     establish communication between the first device and the second device, by the server communicating the one or more requests that are capable of being processed by the second device, to the second device, wherein each of the first module and the second module is a software plugin.

6. The system according to claim 5, wherein a mode of communication between the server and the first device is different from a mode of communication between the server and the second device.

7. A non-transitory computer readable medium having stored therein a set of instructions for establishing communication between plurality of Internet of Things devices, wherein the set of instructions when executed by a processor causes the processor to performs steps comprising:
   receiving, at a server, a request from a first device to communicate with a second device;

identifying, by the server, the first device and a first module corresponding to the first device, among a list of modules stored in the server, based on at least the received request and the list of modules, wherein the first module is stored in the server;

converting, by the first module, the request into a Universal Resource Locator (URL) based instruction, wherein the URL comprises a plurality of segments in the following order: server name, port number, command to be executed, device identity, parameter corresponding to the device, and a value corresponding to the parameter;

identifying, by the server, the second device and a second module corresponding to the second device, among the list of modules stored in the server, based on at least the received request and the list of modules, wherein the second module is stored in the server, wherein the one or more instructions are accessed by the second module, wherein the second module converts the one or more instructions into one or more requests that are capable of being processed by the second device; and establishing communication between the first device and the second device, by the server communicating the one or more requests that are capable of being processed by the second device, to the second device, wherein each of the first module and the second module is a software plugin.

* * * * *